(12) United States Patent
Pantelic et al.

(10) Patent No.: US 10,406,847 B2
(45) Date of Patent: Sep. 10, 2019

(54) SECURITY TAG CONTAINING A PATTERN OF BIOLOGICAL PARTICLES

(71) Applicant: Institute of Physics Belgrade, University of Belgrade, Belgrade (RS)

(72) Inventors: Dejan Pantelic, Belgrade (RS);
Mihailo Rabasovic, Belgrade (RS);
Aleksandar Krmpot, Belgrade (RS);
Vladimir Lazovic, Belgrade (RS);
Danica Pavlovic, Belgrade (RS)

( * ) Notice: Subject to any disclaimer, the term of this patent is extended or adjusted under 35 U.S.C. 154(b) by 0 days.

(21) Appl. No.: 16/067,283

(22) PCT Filed: Dec. 30, 2015

(86) PCT No.: PCT/EP2015/081400
§ 371 (c)(1),
(2) Date: Jun. 29, 2018

(87) PCT Pub. No.: WO2017/114570
PCT Pub. Date: Jul. 6, 2017

(65) Prior Publication Data
US 2019/0023055 A1    Jan. 24, 2019

(51) Int. Cl.
*G09F 3/02*    (2006.01)
*B42D 25/36*    (2014.01)
(Continued)

(52) U.S. Cl.
CPC ............. *B42D 25/36* (2014.10); *B42D 25/45* (2014.10); *G06K 7/10366* (2013.01);
(Continued)

(58) Field of Classification Search
None
See application file for complete search history.

(56) References Cited

U.S. PATENT DOCUMENTS 4,011,308 A * 3/1977 Giaever .................. B82Y 5/00
435/5
4,279,200 A    7/1981 Newcomb
(Continued)

FOREIGN PATENT DOCUMENTS

DE    10 238 506    3/2004
DE    10 2007 052 009    12/2008
(Continued)

OTHER PUBLICATIONS

Buchanan et al., "Fingerprinting' documents and packaging," Nature, vol. 436, 2005, p. 475.
(Continued)

*Primary Examiner* — Christle I Marshall
(74) *Attorney, Agent, or Firm* — Grüneberg and Myers PLLC

(57) ABSTRACT

A security tag can be used to identify or authenticate a substrate that has the security tag. The security tag includes a pattern of inimitable biological particles, a transparent adhesive layer, a substrate, and a transparent superstrate, where the pattern of inimitable biological particles is directly transferred from an organism to the transparent adhesive layer on the substrate, and where said biological particles are covered with the transparent superstrate, such that said inimitable biological particles are encapsulated between said substrate and said superstrate.

11 Claims, 13 Drawing Sheets

(51) Int. Cl.
*B42D 25/45* (2014.01)
*G06K 7/10* (2006.01)
*G09F 3/00* (2006.01)
*G09F 3/10* (2006.01)

(52) U.S. Cl.
CPC .............. *G09F 3/0297* (2013.01); *G09F 3/10* (2013.01); *G09F 3/0292* (2013.01); *G09F 2003/0208* (2013.01)

(56) References Cited

U.S. PATENT DOCUMENTS

| | | | |
|---|---|---|---|
| 8,189,247 B2* | 5/2012 | Winterbottom | G03H 1/0011 359/2 |
| 8,408,470 B2 | 4/2013 | Komatsu et al. | |
| 2010/0075858 A1* | 3/2010 | Davis | C12Q 1/6813 506/4 |
| 2014/0037158 A1* | 2/2014 | McNulty | G06K 9/00013 382/125 |
| 2017/0038353 A1* | 2/2017 | Zografos | G01N 33/025 |

FOREIGN PATENT DOCUMENTS

| | | |
|---|---|---|
| WO | 2007/031077 | 3/2007 |
| WO | WO-2017114569 A1 * | 7/2017 |

OTHER PUBLICATIONS

Pappu et al., "Physical One-Way Functions," Science, vol. 297, 2002, pp. 2026-2030.

Grubb, "Benjamin Franklin and the birth of the paper money economy," published essay given by lecture on Mar. 30, 2006, published by the Federal Reserve Bank of Philadelphia.

Berthier et al., "Butterfly inclusions in Van Schrieck masterpieces. Techniques and optical properties," Appl. Phys. A, vol. 92, 2008, pp. 51-57.

Cowan, "Butterfly wing-prints," J. Soc. Biblphy. Nat. Hist., vol. 4, 1968, pp. 368-369.

Edwards, "A receipt for taking figures of butterflies on thin gummed paper," in Essays upon Natural History and other Miscellaneous Subjects, London, 1770, pp. 117-119.

Sun et al., "Structural coloration in nature," RSC Adv., vol. 3, 2013, pp. 14862-14889.

Yoon et al. "Recent functional material based approaches to prevent and detect counterfeiting," J. Mater. Chem. C, vol. 1, 2013, pp. 2388-2403.

Biro et al., "Photonic nanoarchitectures in butterflies and beetles: valuable sources for bioinspiration," Laser & Photonics Review, vol. 5, No. 1, 2011, pp. 27-51.

Sotiropoulou et al., "Biotemplated Nanostructured Materials", Chem. Mater. vol. 20, 2008, pp. 821-834.

di Francia, "Degrees of Freedom of an Image", JOSA, vol. 59, No. 7, 1969, pp. 799-804.

International Search Report mailed in PCT/EP2015/081400 dated Sep. 2, 2016, filed in this application dated Jun. 29, 2018.

Written Opinion of the International Searching Authority, mailed in PCT/EP2015/081400 dated Sep. 2, 2016, filed in this application dated Jun. 29, 2018.

International Preliminary Report on Patentability mailed in PCT/EP2015/081400, dated Jul. 3, 2018.

\* cited by examiner

SECURITY TAG CONTAINING A PATTERN OF BIOLOGICAL PARTICLES

This application is a National Stage entry under § 371 of International Application No. PCT/EP2015/081400, filed on Dec. 30 2015.

FIELD OF INVENTION

The present invention relates to security tags for identification and authentication of goods, articles and documents.

BACKGROUND OF INVENTION

Optically variable devices (OVD) are a common protective element on various types of documents (e.g. identity cards, passports, visas, bank cards)—see the book "Optical Document Security", ed. by R. L. Van Renesse, Artech House, (1998). Holograms and other diffractive elements are mainly used, because their protective value is based on complexity of micron and submicron structures. Manufacturing is a complicated and expensive process whose final result is a master hologram—a single, unique prototype. To make protection commercially acceptable, the master hologram is copied and multiplied, resulting in a replica shim used for embossing into a plastic foil, which is then integrated into a document using a hot tool. The final result is a series of documents possessing exactly the same protective OVD. This is a significant drawback, because, if the OVD is counterfeited, a large number of fake documents can be manufactured.

As a result, there is ongoing research for a simple and affordable document individualization method. This makes counterfeit much harder, because each and every document has to be copied individually, i.e. large scale production of false documents becomes impossible. However, the trivial individualization by simply printing numbers will not work, because it is too simple and affordable, if using modern printing technologies (e.g. laser printing). Therefore the individualization-bearing features must possess a significant amount of complexity together with strong, unrepeatable, individual properties. They have to be comparable in its uniqueness with biometric characteristics, such as: fingerprints, iris and retina pattern, but significantly more complex and miniscule. Currently used OVD security methods are not well suited for individualization (fingerprinting), as this will significantly increase the production prices.

Attempts to obtain "fingerprint" documents are based on the idea of physical one-way functions (C. Boehm, M. Hofer, "Physically unclonable functions in theory and practice", Springer, 2013)—which are physical devices simple to manufacture, yet extremely difficult to reverse engineer and copy. Random structures can be highly significant for document security, because they offer simple and cheap production, almost impossible re-origination and unique features. It was proposed to tag documents with randomly dispersed objects such as metal, fluorescent or optical fibers (van Renesse book, and references therein).

Natural fibrous structure of paper-based substrates was used (J. D. R. Buchanan, R. P. Cowburn, A-V. Jausovec, D. Petit, P. Seem, G. Xiong, D. Atkinson, K. Fenton, D. A. Allwood, M. T. Bryan, "'Fingerprinting' documents and packaging", Nature 436, (2005) 475). Laser beam was scattered from the paper surface and its statistics was observed and recorded. This however requires a large scale scanning of the document surface which is a slow process, and paper structure may be strongly affected by printing and everyday usage.

Yet another technique was described in R. Pappu, B. Recht, J. Taylor, N. Gershenfeld, "Physical One-Way Functions," Science 297, (2002) 2026-2030, where mesoscopic scattering from disordered array of plastic spheres embedded in a transparent substrate was used to construct physical one-way function. The response of the system strongly depends on the illumination direction, again producing unique individual characteristics. The proposed method is limited by the physical requirements for the mesoscopic scattering, resulting in a 10 mm×10 mm sized tag, with 2.5 mm thickness, which is unsuitable for the modern plastic card technology. Furthermore, the dimension of scattering particles is rather large—500-800 µm in diameter, with 100 µm average spacing—resulting in a bulky system which can be reverse engineered by techniques like micro-tomography.

It is a common knowledge that certain natural characteristic of living creatures are essentially complex and hard to reproduce. This was first realized by Benjamin Franklin who used this for document protection (Farley Grubb, "Benjamin Franklin and the birth of the paper money economy", Essay based on Mar. 30, 2006 lecture, published by Federal Reserve Bank of Philadelphia). He made casts of plant leaves (correctly recognizing the uniqueness of their venation) and used them to print the first dollar bills. Due to further technological advancements, Franklin's method became obsolete, and was replaced with different printing techniques, such as: intaglio, guilloche, watermark, holograms, etc.

Complexity of natural structures was observed in art, too. Japanese painters used fish printing (gyotaku) to directly transfer fish features, instead of painting them. Later, Leonardo Da Vinci directly printed leaf venation on the paper, while Dutch painter Otto Marseus Van Schrieck transferred butterfly wing scales to his canvases (S. Berthier, J. Boulenguez, M. Menu, B. Mottin, "Butterfly inclusions in Van Schrieck masterpieces. Techniques and optical properties", Appl. Phys. A, 51-57, (2008)). Today, all the techniques have the common name: nature printing (R. Newcomb, "Method for producing nature prints", U.S. Pat. No. 4,279, 200 A, (1981), C. F. Cowan, "Butterfly wing-prints", J. Soc. Biblphy. Nat. Hist., 4 (1968) 368-369, D. G. Edwards, "A receipt for taking figures of butterflies on thin gummed paper", in Essays upon natural history and other miscellaneous subjects, pg. 117).

Patents WO 2007031077 (A1) March 2007, C. Hamm-Dubischar, "Inorganic marking particles for characterizing products for proof of authenticity method for production and us thereof" and DE10238506 A1, 3/2004, H. Rauhe, "Producing information-bearing micro-particulate mixtures involves defining code that can be implemented using natural or subsequently applied particle characteristics selected from e.g. morphology", disclosed an idea for document protection which uses natural complexity of aquatic organism inorganic shells (like diatoms and radiolarians) according to characteristics of their surfaces. The practicing method is, however, not disclosed. Another problem is that the optical effects are not very pronounced, and the complexity can be observed only at the sub-wavelength levels, using electron microscopy. Technique for estimating the degree of complexity was not described, either. Variation among the specimens of the same species is rather small. In that respect, the method can be used only for the forensic level of document authentication.

Recently, there was a significant amount of research aimed at using the principles of optics in nature for document protection—biomimetics (J. Sun, B. Bhushanand J. Tong, "Structural coloration in nature", RSC Adv., 2013, 3, 14862-14889, B. Yoon, J. Lee, I. S. Park, S. Jeon, J. Lee, J-M. Kim, "Recent functional material based approaches to prevent and detect counterfeiting", J. Mater. Chem. C 1, (2013) 2388-2403). Variability of biological structures was also observed (L. P. Biro and J-P. Vigneron, "Photonic nanoarchitectures in butterflies and beetles: valuable sources for bioinspiration", Laser Photonics Rev. 5, No. 1, 27-51 (2011)). Biotemplating was used to manufacture butterfly scale-like structures using metals (S. Sotiropoulou, Y. Sierra-Sastre, S. S. Mark, and C. A. Batt, "Biotemplated Nanostructured Materials", Chem. Mater. 2008, 20, 821-834).

The randomized systems described above must be machine-inspected, based on radiation scattering with consequent optical or microwave detection (in the case of metal inclusions). Recorded pattern is encrypted and stored in a central repository or on the document, itself. Public key encryption method is used, as described in the report: "Counterfeit deterrent features for the next generation currency design", Committee on Next-Generation Currency Design, National Materials Advisory Board, Commission on Engineering and Technical Systems, National Research Council, Publication NMAB-472, (1993), Section: Random Pattern/Encryption Counterfeit-Deterrence Concept, pg. 74-75, and Appendix E: "Methods for authentication of unique random", pg. 117-119. A technique is based on two keys: a secret one, used for encryption, and a public one, used for the decryption.

All the methods used a complexity of natural structures but their variability remained completely unused in the context of the document protection. Document variability was rather attained by randomly dispersing particle- or thread-like entities across the document, as described in the patent literature (U.S. Pat. No. 8,408,470B2, 2013, N. Komatsu, S-I. Nanjo, "Object for authentication verification, authentication verifying chip reading device and authentication judging method").

SUMMARY OF THE INVENTION

This invention solves the problem of identicalness of, presently used, document security features (e.g. holograms and other OVDs), making them vulnerable to counterfeiting. Presently, security elements are identical on the same type of document (passport, visa, credit card), without variability between the individual documents. This eases the counterfeiting process because, once the counterfeit is made, it can be applied to any number of documents. The invention uses naturally occurring biological particles, whose variability is guaranteed by the large number of degrees of freedom of biological processes. They are used to manufacture a tag, which can be further applied to a document or a product, thus making it unique.

A security tag and a manufacturing method are disclosed.

The security tag of the present invention is characterized by a pattern of inimitable biological particles, directly transferred from an organism to a transparent adhesive layer on a substrate, covered with a transparent superstrate, such that said biological particles are encapsulated between said substrate and said superstrate.

In one embodiment of the present invention, the pattern of biological particles is in the shape of a bar-code or QR-code.

In another embodiment of the present invention, the pattern of biological particles is in the shape of a silhouette of a human head or, alternatively, in the shape of a fingerprint.

Preferably, the biological particles are overtly inscribed with information by mechanical or laser cutting.

Alternatively, the biological particles are covertly inscribed with information by permanently bleaching their fluorescence.

Preferably, the biological particles are selected from Lepidoptera scales, hairs or bristles, Coleoptera scales, Trichoptera hairs or bristles, and Arachnides scales.

More preferably, the biological particles are taken from several different species, and assembled on the substrate in a predetermined pattern.

In one embodiment of the present invention, selected parts of the superstrate are covered with a transparent layer of adhesive, which permanently adheres to the biological particles.

Furthermore, the invention is directed to the use of a security tag according to the present invention for identification and authentication of goods, articles and documents.

Finally, the invention is directed to a method of manufacturing a security tag according to the present invention, comprising the following steps:

(1) providing for at least one biological particle on a surface;
(2) cutting an optically transparent tape, with a low surface energy adhesive layer, in a predetermined shape to form a first pre-cut tape;
(4) pressing the first pre-cut tape onto the surface with the biological particles;
(5) removing the first pre-cut tape from the surface with the biological particles, with a majority of the biological particles being attached to the first pre-cut tape;
(6) bringing in contact the first pre-cut tape with attached biological particles (10) with a second, high surface energy, optically transparent, adhesive tape, such that the adhesive layers face each other;
(7) lifting-off the first pre-cut tape from the second tape;
(8) covering the second tape with a third optically transparent tape, which is smaller than the second tape to form the security tag ready to be attached to goods, articles or documents.

A tag according to the present invention comprises a multiplicity of selected, micron-sized, parts of an insect body (biological particles), attached on a substrate surface within the predetermined area having well defined, easily recognizable, shape. Biological particles are directly transferred to the substrate, retaining their original physical characteristics and spatial arrangement. Said biological particles are selected according to a high level of complexity and variability of their optical properties, observable under different image magnifications. Overall tag size is such that it enables visual inspection and easy recognition by the user, as well as machine inspection at the microscopic level.

Complexity is measured by the statistically averaged volume to surface ratio of the biological particle (FIG. 1 and FIG. 2 show the typical complexity of insect body-scales found on the cuticle of some insects). Preferably, the volume/surface ratio is less than 50 nm. Variability is defined through the number of degrees of freedom (G. T. di Francia, "Degrees of freedom of an image", JOSA 59, (1969) 799-804) of the observed biological particle image at the defined magnification (FIG. 6 presents optical patterns of insect body-scales 7 recorded at different magnifications). Preferably, the number of degrees of freedom should be larger than 1000.

It is required that the observed optical effects are strongly localized, variable and individual and the result of interference, diffraction and scattering (including their polarization and angular dependence) from a complex three-dimensional structure. Additionally, tissues and cells are chosen to be durable, with permanent optical properties and capable of being transferred to the substrate and processing prior, during and after attachment to the substrate. A substrate which receives the biological structure thus becomes unique and unrepeatable. The resulting tag can be further attached on various types of objects demanding individualization and secure identification.

A tag substrate may contain three printed markers, which are used as a reference to generate a local coordinate system. Selected features of insect body parts attached to the tag are used as the machine-readable security code (second line of protection).

Tag manufacturing process consists of several stages, which use adhesive tapes with varying surface energy. The first tape is used to lift off the biological particles from the organism. They are transferred to a higher surface energy tape, where they remain permanently affixed and protected by an additional protective layer.

DETAILED DESCRIPTION OF THE INVENTION

In cooperation with the attached drawings, the technical contents and detailed embodiments of the present invention are described hereinafter, however, not limiting its scope of protection, which is exclusively defined by the claims. Any equivalent variation and modification made according to the appended claims is to be included into their scope of protection.

An optical tag is disclosed which contains a number of biological particles selected according to their complexity and variability. Before describing the construction of a tag and its various embodiments, we assign concrete meaning to notions of complexity and variability. This is necessary in order to select the best species and biological particles, which guarantee the anti-counterfeit properties of a tag.

Figure 1:
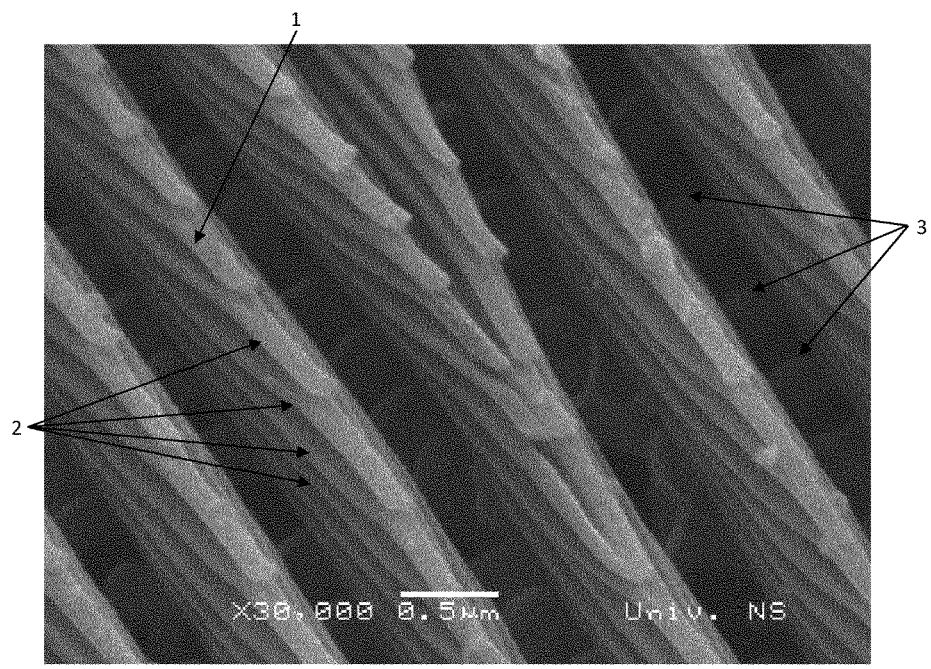
FIG. 1: Butterfly scale observed under the scanning electron microscope (SEM).
Figure 4:
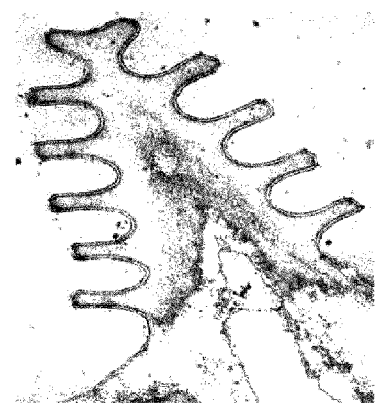
FIG. 4: Gamma corrected image of the butterfly scale from FIG. 3, where edges are emphasized.
Figure 5:
FIG. 5: Thresholded version of the image in FIG. 3, enabling calculation of the enclosed surface area.

In reference to FIG. 1, the typical complexity of biological particles can be observed, e.g. Lepidoptera scales. Structure consists of two types of gratings: a volume grating which is characterized by ridges 1 having a number of lamellas 2, and a surface grating consisting of cross-ribs 3 connecting the ridges. By observing the cross-section of the scale (FIG. 2), it can be seen that the scale has two membranes: a lower one 4, which is unstructured, and an upper one 5, which contains ridges, lamellas and cross-ribs. By using magnified cross-section of a complex part of the butterfly scale in FIG. 3, the complexity can be quantified by determining the contour length to contour enclosed-surface ratio. Contour length is determined by first digitally emphasizing object edges (see FIG. 4) and calculating the total number of black pixels—$L_b$. Surface area is determined by digitally thresholding image in FIG. 3 (the result of the operation is shown in FIG. 5), and integrating the total number of black pixels $S_b$. Complexity C is thus $C=S_b/L_b$.

Figure 2:
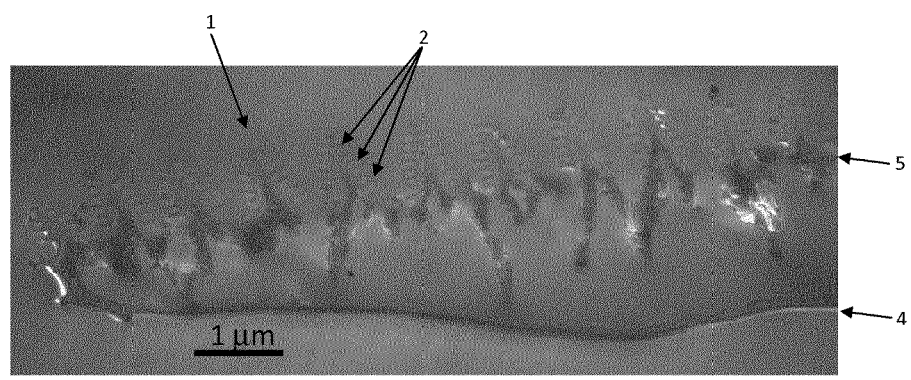
FIG. 2: Cross-section of the butterfly scale observed under the transmission electron microscope (TEM).
Figure 3:
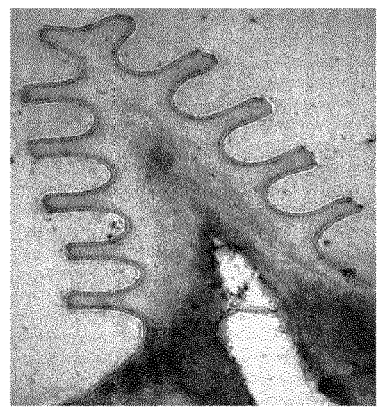
FIG. 3: Magnified cross-section of the butterfly scale ridge, observed under the TEM microscope.
Figure 6:
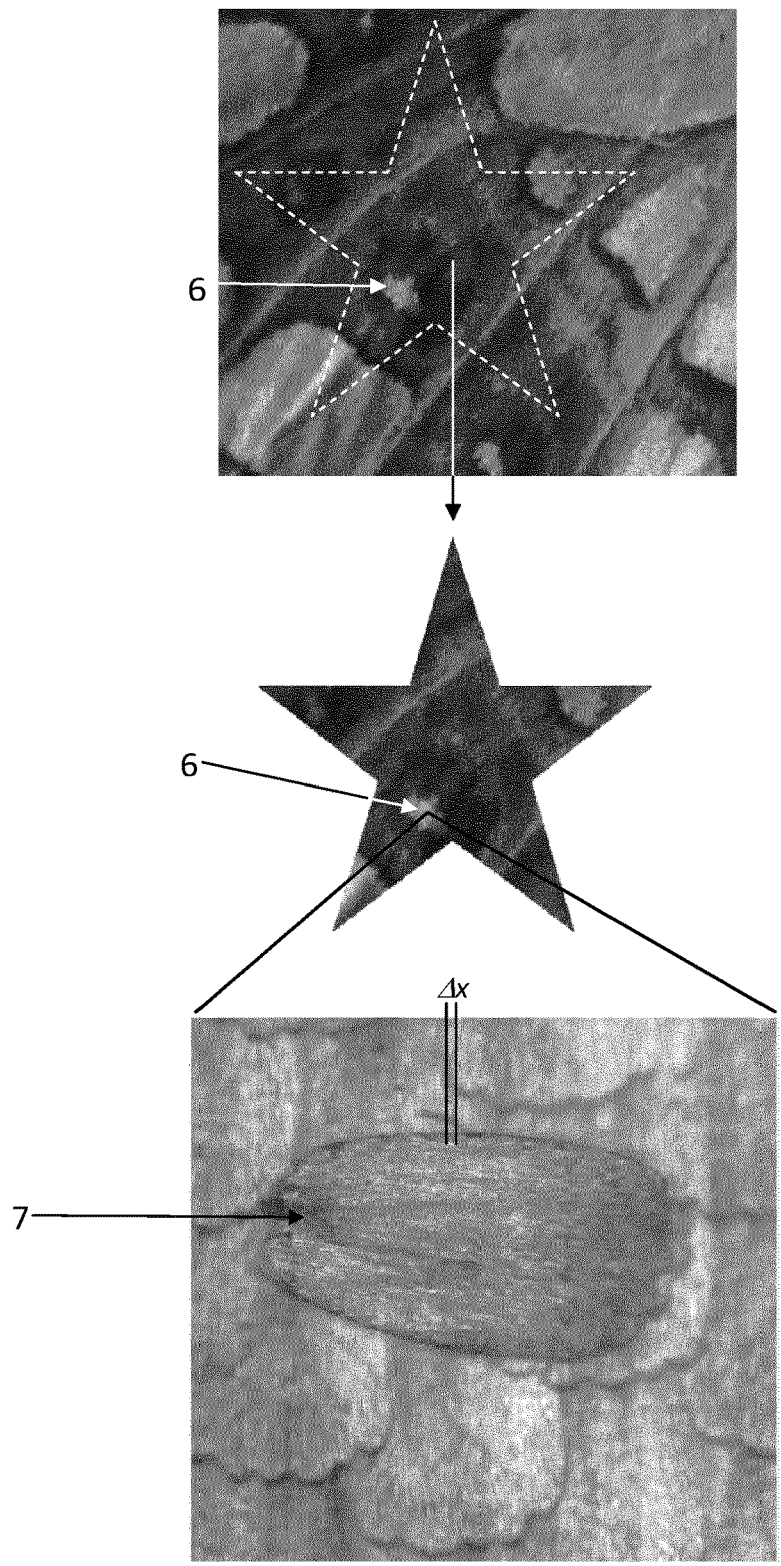
FIG. 6: Part of the butterfly wing is star-shaped cut, such that an iridescent patch is included, whose magnified image reveals individual scales with number of dots of different intensity and spectral content.

Natural variation in the internal structure of the biological particles, e.g. Lepidoptera scale (as shown in FIGS. 1, 2 and 3), leads to variability of resulting optical effects. FIG. 6 shows a star-shaped part of the butterfly wing transferred on another substrate. Concrete Lepidoptera species and cut position are chosen such that the resulting piece contains at least one iridescent spot 6. Its magnified image reveal scales 7 having a number of dots of varying intensity and spectral content. Their position, optical spectrum and intensity are unpredictable and define degrees of freedom. Their number N is used a measure of variability. This can be estimated by calculating the ratio of the individual scale surface area S (easily calculated from an image) to the average dimension of a dot $\Delta x$ (FIG. 6). The last feature is connected to spectral width of the signal via relation:

$$\Delta x \Delta v = 1/(4\pi)$$

Figure 7:
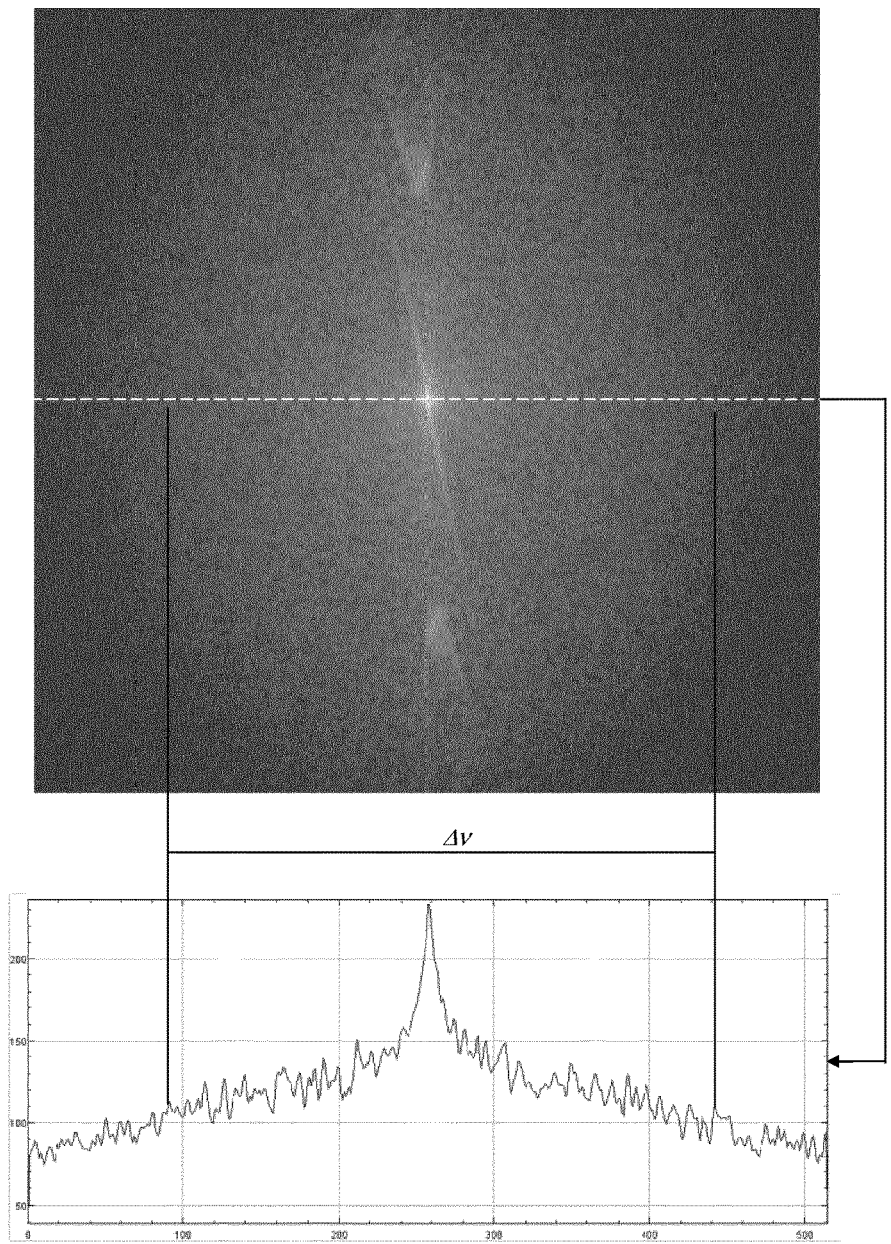
FIG. 7: A Fourier transform of the scale in FIG. 6 is used to calculate signal bandwidth $\Delta v$.
Figure 8:
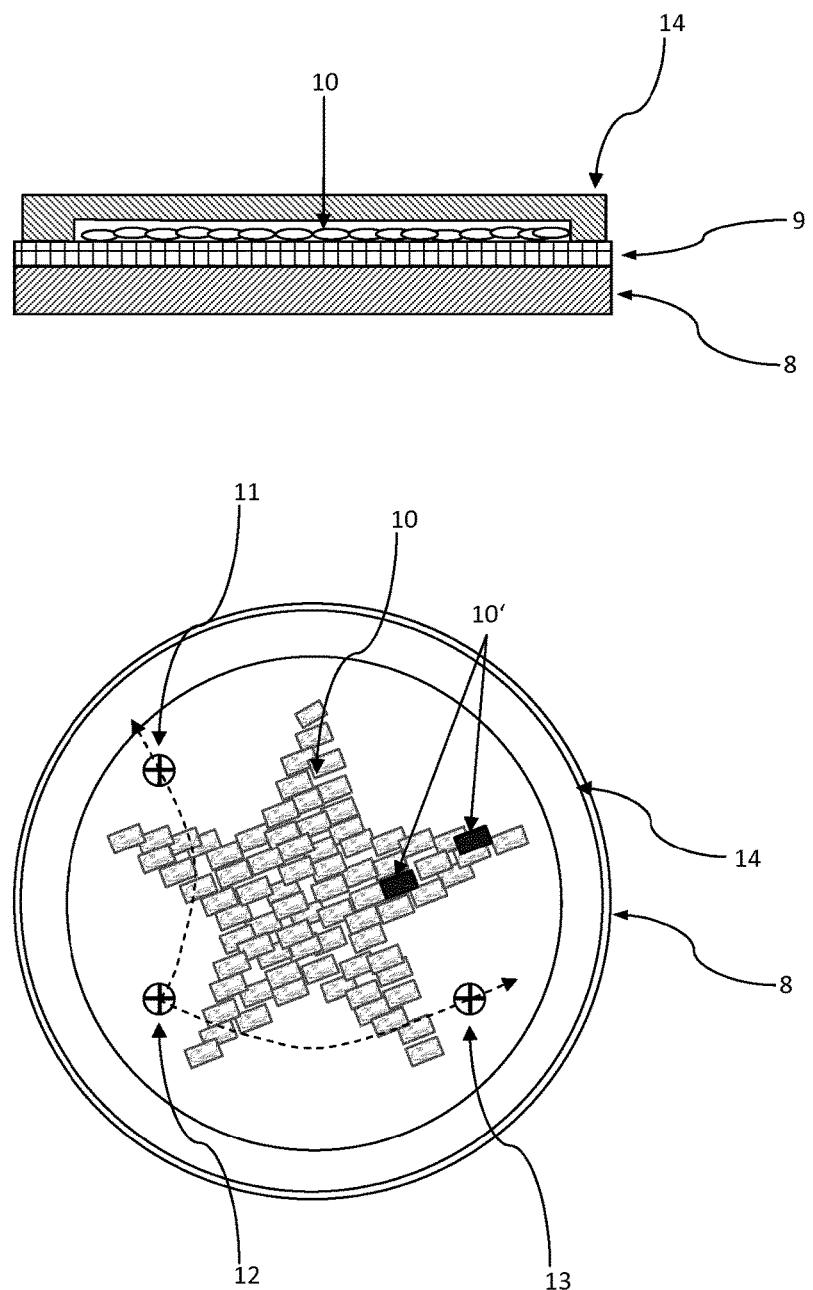
FIG. 8: A tag with transferred biological particles.

(see FIG. 7, where Fourier transform of the Lepidoptera scale image is shown). By measuring the spectral width $\Delta v$, average dot dimension $\Delta x$ can be calculated. Finally, the number of the degrees of freedom is calculated as $N=S/\Delta x$ In reference to FIG. 8, a preferred embodiment of an optical security tag according to the invention is shown by presenting it in two orthogonal projections. A substrate 8 is covered with a thin, transparent, adhesive layer 9. Biological particles 10 firmly adhere to the said adhesive layer, producing an easily recognizable pattern (e.g. a symbol, a letter, a barcode, a silhouette, etc.). Adhesion of the biological particles 10 is such that the attempt of removal destroys their submicron-sized structure. Three visible marks 11, 12 and 13 (e.g. crosses) are printed on the substrate 8, and are used for positioning the tag in a well defined position, with respect to the optical reading system. They also define a local coordinate system which can be curvilinear and non-orthogonal (designated with dashed lines). The exact mathematical nature of the coordinate system is known only to the issuer of the tag. The biological particles 10 are protected by a transparent cover 14. One or several particles 10' are randomly selected as bearers of individualization pattern. Their position with respect to markers 11, 12 and 13 is determined and memorized. In addition, their optical pattern (7 in FIG. 6) is recorded and memorized, too.

Figure 9:
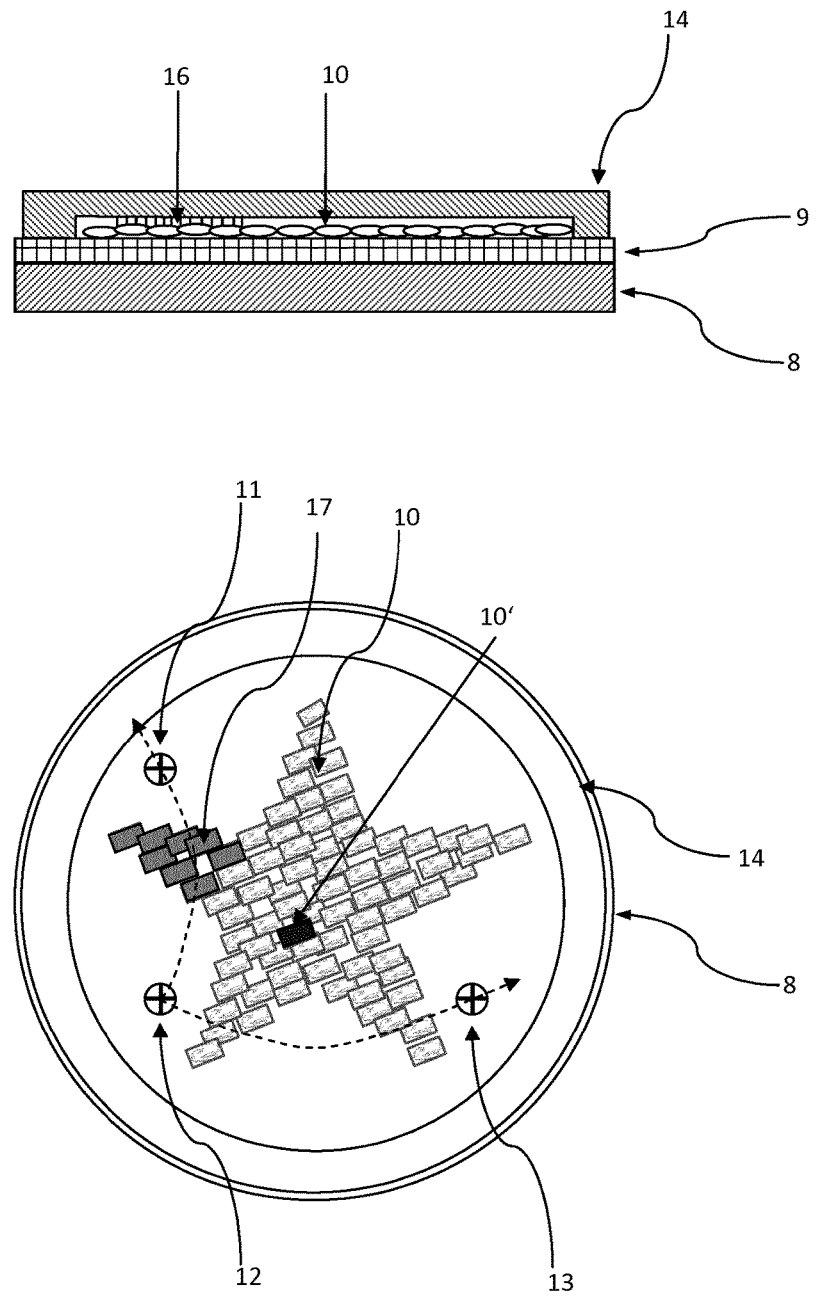
FIG. 9: A tag with transferred biological particles and superstrate having an adhesive layer which changes the iridescence color.
Figure 10:
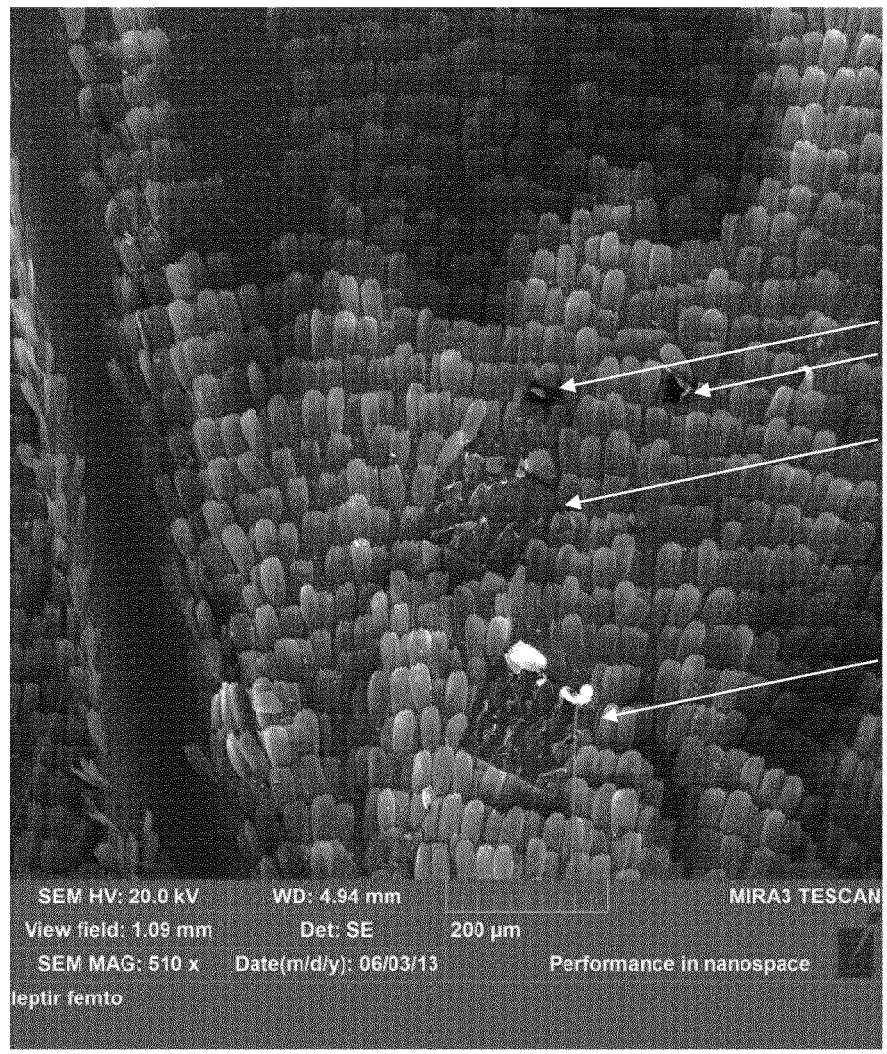
FIG. 10: Square-shaped cuts in a butterfly wing (designated with white arrows), as observed under the scanning electron microscope.
Figure 11:
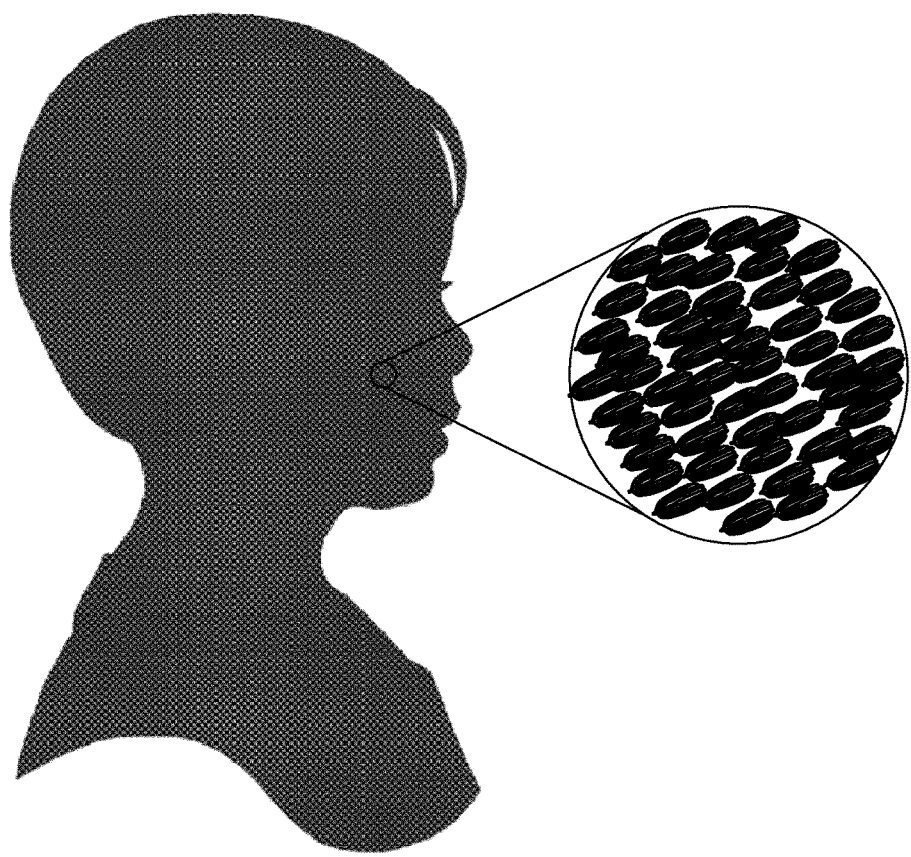
FIG. 11: A silhouette made of biological particles.
Figure 12:
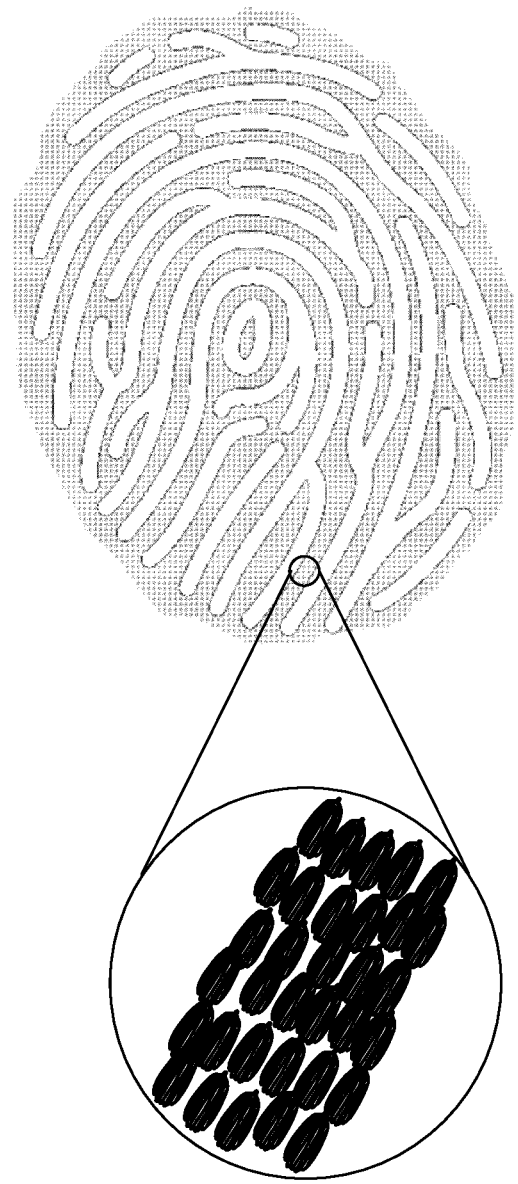
FIG. 12: A fingerprint made of biological particles.
Figure 13:
FIG. 13: A bar-code made of butterfly scales.
Figure 14:
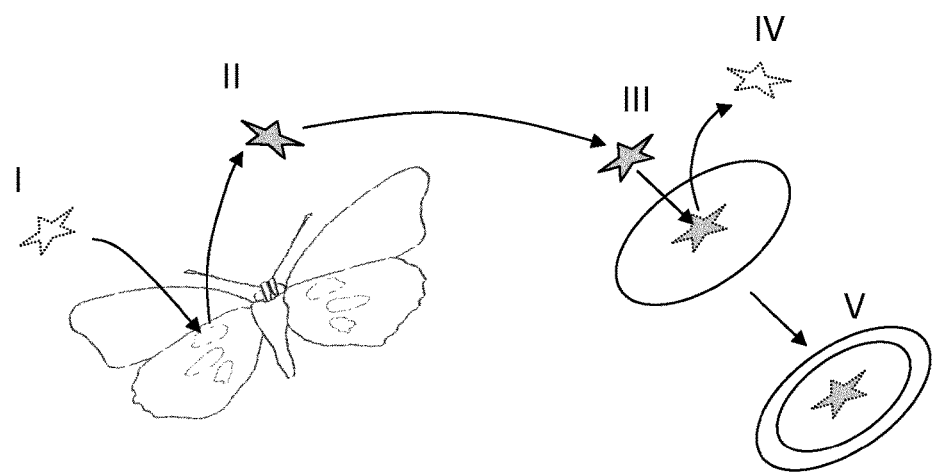
FIG. 14: A manufacturing process of a tag with biological particles.
Figure 15:
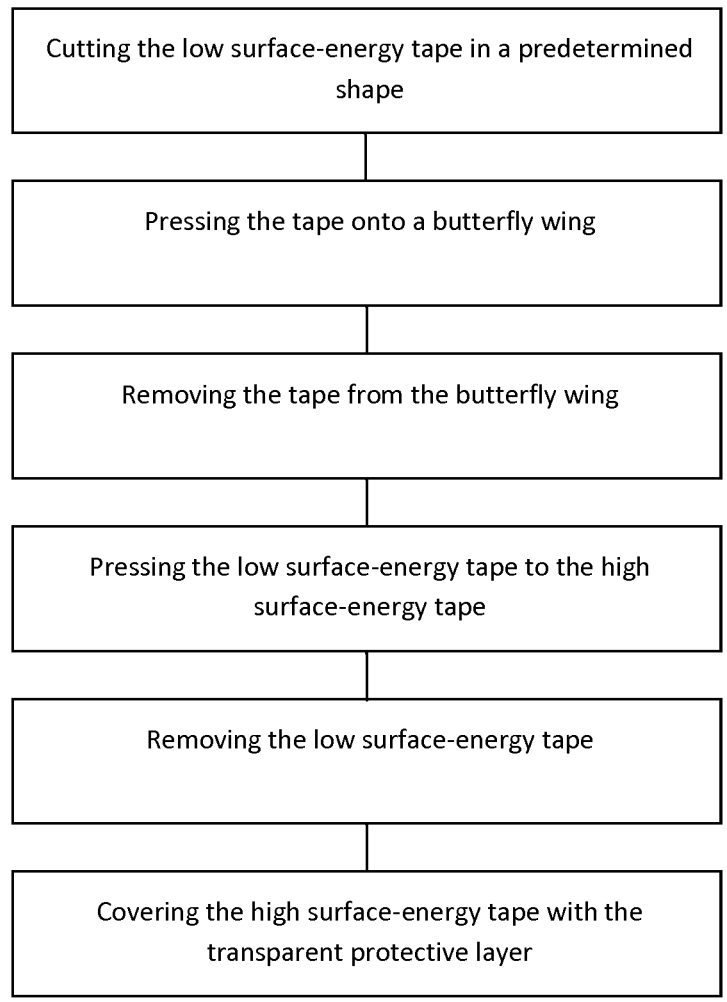
FIG. 15: A flow chart of the manufacturing process of a tag with biological particles.
Figure 16:
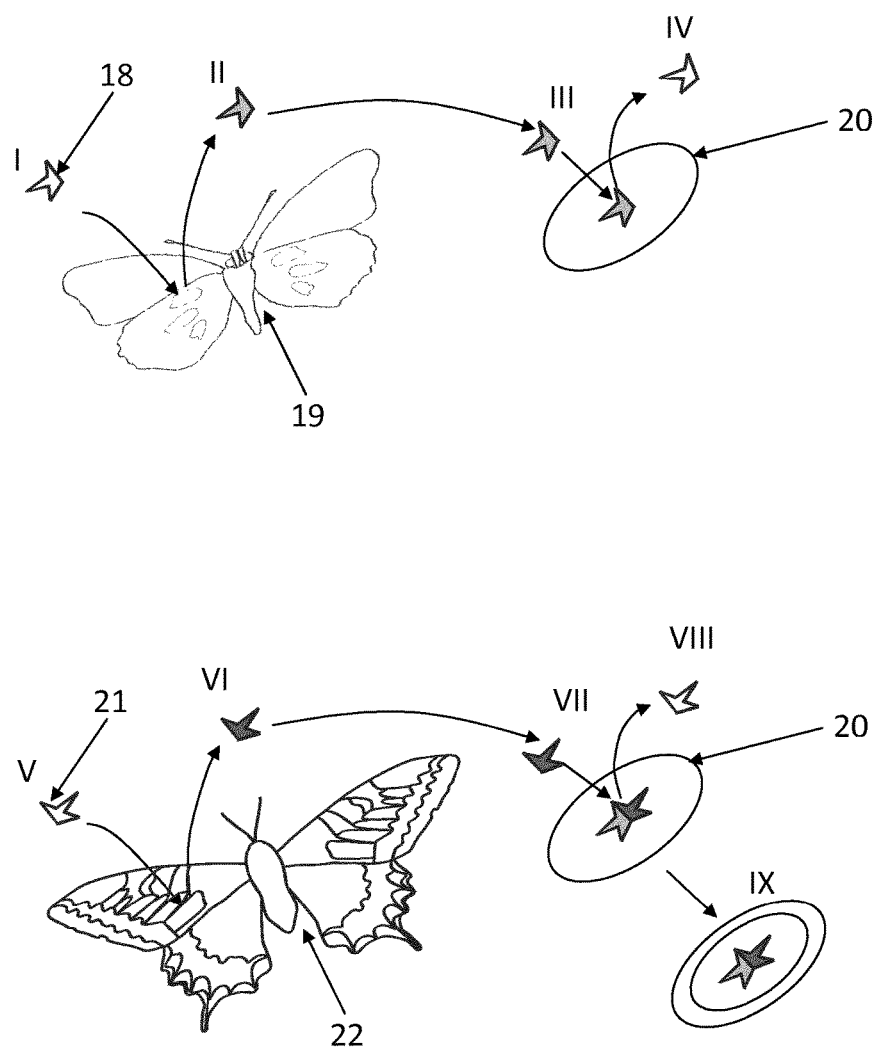
FIG. 16: A manufacturing process of a tag with biological particles belonging to different biological species.

In another embodiment (FIG. 9) the superstrate 14 comprises a patterned adhesive layer 16 which permanently affixes to the biological particles. This serves a dual purpose. First, the refractive index of the layer changes the refractive index above the biological particles and alters the iridescent color of one part of the pattern 17. As in the previous embodiment, one or several scales 10', are randomly selected as bearers of individualization pattern. In addition, any attempt to disassemble the tag results in separation of biological particles—some of them remain on the substrate and others are lifted with the superstrate, thus producing a tamper sensitive tag.

In another embodiment, the substrate 8 is transparent, thus enabling two-sided observation of the biological particle 10. For some Lepidoptera species, the iridescence pattern is different on each side of the scale. In this embodiment, the optical pattern can be observed both in transmitted and reflected light. The pattern can be a result of diffraction, interference, iridescence, scattering and fluorescence of coherent or incoherent light. Angular, focal and polarization changeability of the pattern is recorded and used as an authentication signal.

In yet another embodiment, transferred biological particles 10 are further patterned by mechanical means. A mechanical tool is engraved with the desired pattern, producing a system of raised and recessed portions. It is pressed onto the pattern, thus crushing the biological particles and changing their optical properties (e.g. iridescence, scattering), producing visually observable pattern.

In yet another embodiment, transferred biological particles are macroscopically patterned by laser cutting or engraving (e.g. square shaped areas designated with white arrows in FIG. 10). A beam from an ultrafast laser is introduced in a system with a computer-controlled galvanometer-mirror scanner, which is used to angularly deflect a beam according to programmed trajectory. The beam is then expanded and focused to the tag with biological particles, using an f-theta lens, which enables flat scanning field and linear relation between the deflection angle and the focal beam position. The laser wavelength, scanning speed and power are chosen such that cutting or engraving is enabled. It is used to draw a personalized, biometric, pattern (e.g. silhouette as in FIG. 11, fingerprint as in FIG. 12, retinal blood vessel pattern, signature, or iris image) onto the surface of a tag with biological particles. In this manner an overt pattern is produced, which can be used for visual and machine authentication.

A further embodiment is characterized by a bar-code or QR-code pattern made from biological particles (FIG. 13).

In another embodiment, fluorescence of transferred biological particles is selectively bleached using high intensity UV radiation. This can be done using an UV projection system consisting of a UV lamp and an objective. A mask, containing transparent and opaque areas which comprise an image, is inserted into the system such that an image is produced directly on a tag with biological particles. Bleaching action is controlled by the intensity of the illuminating beam and the illumination time. Alternatively, a beam from a continuous wave (CW) or ultrafast laser is introduced in a system with a computer-controlled galvanometer-mirror scanner, which is used to angularly deflect a beam according to programmed trajectory. The beam is then expanded and focused to the tag with biological particles, using an f-theta lens, which enables flat scanning field and linear relation between the deflection angle and the focal beam position. Wavelength of a laser is chosen such that the bleaching action is enabled via single-photon process (in the case of a CW laser), or two-photon process (in the case of an ultrafast laser). The laser power and its scanning speed determine the intensity of the bleaching. The pattern is observable using low intensity UV radiation as a covert security feature.

The tag manufacturing process consists of several stages depicted in FIG. 14. First, a tape having an adhesive layer (pressure sensitive) with low peel strength (preferably, the surface energy of the order of 0.5 N/cm) is laser- or die-cut in the required shape. A tape is pressed on the surface covered with biological particles (e.g. a butterfly wing), with their iridescent surface facing up, and they adhere to the tape (phase (I) in FIG. 14). The tape is peeled, lifting-off cells or tissues (phase (II) in FIG. 14). Next, a tape is transferred to a second optically transparent tape having high peel strength and, preferably, surface energy of the order of 2.5 N/cm (phase (III) in FIG. 14). Tapes are pressed together with the adhesive layers facing each other, biological particles being trapped between the layers. After a certain dwell time, the tapes are separated (phase (IV) in FIG. 14). Due to the higher surface energy of the second tape, biological particles from the first plate remain on the second tape. The third, optically transparent, non-adhesive tape is used to cover the biological particles, protecting them from external influences (phase (V) in FIG. 14). The third tape is smaller than the second tape, thus exposing the remaining adhesive layer, which will be used for attachment to an object requiring individualization. A flow chart of the whole process is shown in FIG. 15.

In another embodiment, a tag and associated manufacturing process use biological particles of several species. The final pattern is assembled from two or more sub-patterns transferred from several insect species belonging to e.g. Lepidoptera order, as described in FIG. 16. First, a tape 18 having an adhesive layer (pressure sensitive) with low peel strength (preferably, with a surface energy of the order of 0.5 N/cm) is laser- or die-cut in the required shape. A tape is pressed on the surface 19 covered with biological particles (e.g. a Lepidoptera wing) belonging to one biological species, with their iridescent surface facing up. Biological particles adhere to the tape (phase (I) in FIG. 16). The tape is peeled, lifting off cells or tissues (phase (II) in FIG. 16). Next, a tape is transferred to a second optically transparent tape 20 having high peel strength and, preferably, a surface energy of the order of 2.5 N/cm (phase (III) in FIG. 16). Tapes are pressed together with the adhesive layers facing each other, biological particles being trapped between the layers. After a certain dwell time, the tapes are separated (phase (IV) in FIG. 16). Due to the higher surface energy of the second tape, biological particles from the first plate remain on the second tape. Another tape 21, having an adhesive layer (pressure sensitive) with a low peel strength (preferably, with a surface energy of the order of 0.5 N/cm) is laser- or die-cut in the required shape, complementary to the one described in Phase I of the process. A tape is pressed on the surface 22 covered with biological particles (e.g. a Lepidoptera wing) belonging to another biological species, with their iridescent surface facing up. Biological particles adhere to the tape (phase (V) in FIG. 16). The tape is peeled, lifting off cells or tissues (phase (VI) in FIG. 16). Next, a tape is transferred to, previously manufactured, transparent tape 20 having high peel strength and, preferably, a surface energy of the order of 2.5 N/cm (phase (VII) in FIG. 16).

Tapes are pressed together with the adhesive layers facing each other such that patterns defined by tapes 18 and 21 complement each other. Consequently biological particles are trapped between the layers. After a certain dwell time, the tapes are separated (phase (VIII) in FIG. 16). Due to the higher surface energy of the second tape, biological particles from the first tape remain on the second tape.

In the next phase (IX in FIG. 16) the third, optically transparent, non-adhesive tape is used to cover the biological particles, protecting them from external influences. The third tape is smaller than the second tape, thus exposing the remaining adhesive layer, which will be used for attachment to an object requiring individualization.

The method described in the previous embodiment can be further extended to any number of different biological species.

The invention claimed is:

1. A security tag, comprising:
   a pattern of inimitable biological particles,
   a transparent adhesive layer,
   a substrate, and
   a transparent superstrate,
   wherein the pattern of inimitable biological particles is directly transferred from an organism to the transparent adhesive layer on the substrate, and
   wherein said biological particles are covered with the transparent superstrate, such that said inimitable biological particles are encapsulated between said substrate and said superstrate.

2. The security tag according to claim 1, wherein the pattern of inimitable biological particles is in the shape of a bar-code or a QR-code.

3. The security tag according to claim 1, wherein the pattern of inimitable biological particles is in the shape of a silhouette of a human head.

4. The security tag according to claim 1, wherein the pattern of inimitable biological particles is in the shape of a fingerprint.

5. The security tag according to claim 1, wherein the biological particles are overtly inscribed with information by mechanical or laser cutting.

6. The security tag according to claim 1, wherein the biological particles are covertly inscribed with information by permanently bleaching a fluorescence thereof.

7. The security tag according to claim 1, wherein the inimitable biological particles are particles of at least one member selected from the group consisting of a Lepidoptera scale, hair, a bristle, a Coleoptera scale, Trichoptera hair, a Trichoptera bristle, and an Araneae scale.

8. The security tag according to claim 7, wherein
   the inimitable biological particles are particles of at least two members selected from the group consisting of a Lepidoptera scale, hair, a bristle, a Coleoptera scale, Trichoptera hair, a Trichoptera bristle, and an Araneae scale, and
   wherein the inimitable biological particles are assembled on the substrate in a predetermined pattern.

9. The security tag according to claim 7, wherein
   at least one part of the superstrate is covered with a transparent layer of adhesive, which permanently adheres to the biological particles.

10. A method of identifying or authenticating a good, an article, or a document comprising the security tag according to claim 1, the method comprising:
    scanning the security tag with a scanning device.

11. A method of manufacturing a security tag, comprising:
    (1) providing biological particles on a surface;
    (2) cutting an optically transparent tape, with a low surface energy adhesive layer, in a predetermined shape to form a first pre-cut tape;
    (3) pressing the first pre-cut tape onto the surface with the biological particles provided thereon;
    (4) removing the first pre-cut tape from the surface with the biological particles present thereon, with a majority of the biological particles being attached to the first pre-cut tape;
    (5) bringing into contact the first pre-cut tape with attached biological particles with a second, high surface energy, optically transparent, adhesive tape, such that the adhesive layers face each other;
    (6) lifting-off the first pre-cut tape from the second tape; and
    (7) covering the second tape with a third optically transparent tape, which is smaller than the second tape to form the security tag ready to be attached to goods, articles or documents.

* * * * *